Jan. 6, 1953 A. L. M. A. ROUY 2,624,537
POSITIONING DEVICE
Filed Jan. 10, 1948
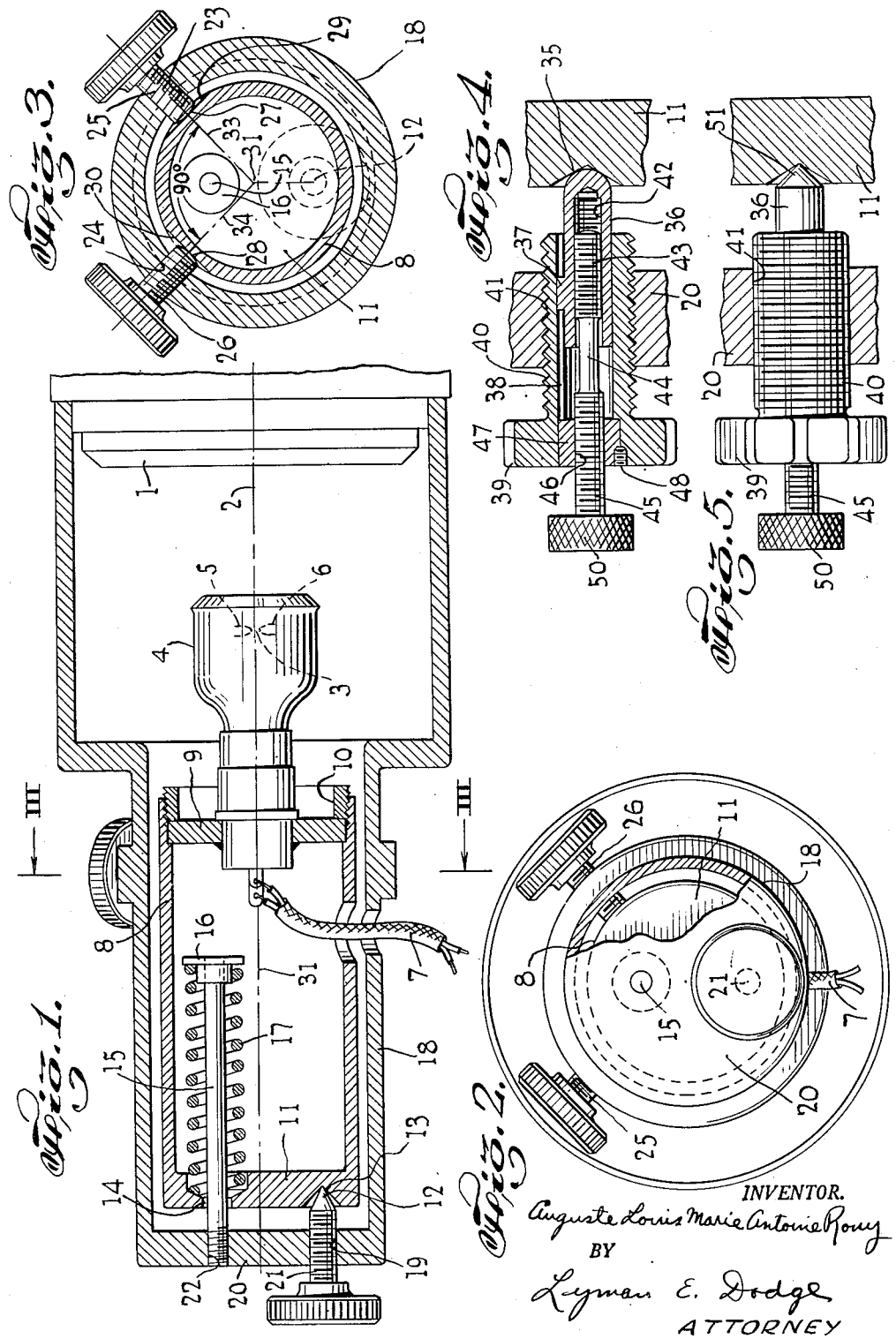
INVENTOR.
Auguste Louis Marie Antoine Rouy
BY
Lyman E. Dodge
ATTORNEY Patented Jan. 6, 1953

2,624,537

UNITED STATES PATENT OFFICE 2,624,537

POSITIONING DEVICE

Auguste Louis Marie Antoine Rouy,
New York, N. Y.

Application January 10, 1948, Serial No. 1,576

4 Claims. (Cl. 248—180)

This invention relates to a positioning device.

A principal object of this invention is to provide a construction whereby a desired object may be readily and quickly precisely positioned.

A further object of this invention is the production of a device of the type described whereby the adjustment of an object along one of three lines positioned at a right angle each to the others will not effectively disturb a prior positioning along any other of those lines.

A further object of the invention is to provide a device of the type described which will accomplish the desired object by the use of a single resilient member.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Figure 1 is a cross sectional view of a device embodying my invention; Fig. 2 is an end elevational view of the device as shown by Fig. 1, viewed from the left hand end as illustrated in Fig. 1; Fig. 3 is a cross sectional view of the device as shown by Fig. 1 on the plane indicated by the line III—III viewed in the direction of the arrows at the ends of the line; Fig. 4 is a cross sectional view of a modified form of adjusting means usable with my invention; Fig. 5 is a plan view of a device such as is shown by Fig. 4 but with a different form of end on a contacting screw.

It is well known that there are many cases in which it is quite necessary to be able to precisely and accurately position an object at a desired point in space. It is quite necessary in using a lamp in connection with a lens projecting system to accurately position the source of light at a particular point in relation to the axis of the lens system and its focal or other determinative point. It is also well known that a device for positioning an object along three lines in space each at a right angle to each of the others should preferably be such that an adjustment along one line will not effectively disturb a previous adjustment along either of the other lines.

My device for positioning is particularly adapted for positioning a source of light in relation to the axis and focal or other determinative point of a lens projecting system, but is adapted for most any situation where precise positioning is required. My invention is also such that a very speedy positioning may be accomplished because the adjustment along any one line of three lines in space at a right angle each to the other does not effectively disturb a previous adjustment along either of the other lines.

In the specific form used to illustrate my invention, I have illustrated it as a means used for positioning a lamp used as a source of light for a lens projecting system.

I designates a fragment of the lens mount of a lens projecting system. The line 2 may designate the axis and the point 3 on the axis may designate the focal or other determinative point of the lens system.

4 designates a lamp. This lamp may be of any suitable form of construction, but is illustrated as the well known zirconium arc lamp in which one side of the arc is designated 5 and the other 6, and the electric current for supplying the arc is transmitted thereto by means of the two electrical conductors 7.

The object of the present invention is to position the arc generated between the terminals 5 and 6 precisely at a point desired, in this case, the point 3.

The lamp 4 is supported by the elongated movable body 8 in any suitable or appropriate manner as by a removable end wall 9 which may be firmly clamped in position by a ring 10.

The elongated movable body 8 is provided with an end wall 11. Of course it will be apparent as the description proceeds that the end wall 11 may be a complete disc or merely a cross bar across the ends of the side walls of the, preferably, cylindrical elongated movable member 8. In fact, the member 11 need not necessarily be continuous from one side to the other of the member 8. It is necessary, however, to furnish a pivot point attached to movable member 8. I have provided a pivot point 12 in the end wall 11. This pivot point is the apex of a conical cavity 13 in which the included angle is about 90°.

The end wall 11 of the elongated movable member 8 also should, preferably, provide a through orifice 14 into and through which a suitable member, such as rod 15, may be protruded and upon which a suitable head 16 may be attached around which a helical compression spring 17 may be positioned with one end bearing against head 16 and the other end against the end wall 11.

For carrying and supporting a pivot point to engage with the apex 12 of the conical cavity in the elongated movable body I provide a fixed body 18. This fixed body may be of any desired configuration but it must provide a cavity therein within which the elongated movable body 8 may be positioned in such a manner that it may pivot about the apex 12 in all directions. The fixed body 18 is formed with a through threaded bore 19 and into this threaded bore and protruding through the end wall 20 is the threaded manually adjustable screw 21 formed with a conical point to engage the conical cavity 13, but with an included angle of less value than that of the conical cavity 13 so that pivoting of the movable body 8 about the conical point of the adjustable screw 21 will not cause the sides of the conical cavity to contact the conical point of the screw.

The end wall 20 also serves as a support for rod 15. In the particular form shown I have illustrated the rod 15 as screw threaded and screwed into a through orifice 22 of the end wall.

As best shown in Fig. 3, the fixed body 18 also has two other screw threaded through orifices therein, as at 23 and 24, in each of which is positioned a manually operable screw threaded lateral adjusting screw, as 25 and 26. The lateral adjusting screws, 25 and 26, are preferably either absolutely flat on their inner ends or slightly arcuate, as 27 and 28, and contact the outer periphery of the movable member 8. The movable body 8 is formed with flats or flat surfaces for the purpose of contacting the screws, 25 and 26. These flat surfaces 29 and 30, are at right angles to the axes of the respective screws and extend longitudinally of the movable body 8 a suitable distance so that the movable body 8 will never move longitudinally sufficient to move the flats from beneath the screws 25 and 26.

The pivot point 12, as best shown in Fig. 3, is positioned in a longitudinal plane of the movable body 8 which passes through its axis 31 and is positioned, preferably, as close to the outer wall of the movable member 8 as is practicable.

The axis of the rod 15 is also preferably positioned in the same plane as the pivot point 12, but on the other side of the axis of the movable body 8 and preferably as far removed from that axis as is practicable.

The axes of the two laterally adjusting screws 25 and 26 are positioned in longitudinal planes passing through the axis of the movable body 8 and including between them an angle of 90°, all as best shown in Fig. 3.

It will also be seen, particularly by reference to Fig. 3, that the plane in which 12 is positioned makes equal angles with the planes in which the axes of 25 and 26 are positioned.

From the hereinbefore given description it will be understood that a manipulation of screw 21 causes movable member 8 to move in a straight line substantially parallel to the axis 31, at least, when the central point 32 of the arc is substantially on the axis 31, and that the movable body 8 is always held tightly against the end of the screw 21 by means of the spring 17.

It will also be understood from the hereinbefore given description that if manually adjustable screw 25 is adjusted inwardly the movable member 8 will be moved in a direction of the axis of the screw 25, that is, along the line 33, pivoting on the end of screw 21 and without effectively disturbing the longitudinal adjustment which may have been previously given by screw 21. It will also be observed, that if lateral adjusting screw 26 is manipulated to move movable body 8, it will move it in a direction along the line of the axis of the screw 26, that is, in the direction of the line 34, and this movement will not effectively disturb a previous adjustment made by screw 21 along the axis or a previous adjustment made by screw 25 in a direction along the line 33.

Each adjustment along directions parallel to three lines situated in space and each positioned at an angle of 90° to each of the others may be be made without effectively disturbing a previous adjustment made along any one of the other lines. This construction reduces the time of adjusting an object to a partciular point because each one of the three adjustments may be made without effectively disturbing the other adjustments lengthwise of the lines along which they are intended to have effect.

At all times the single helical spring 17 maintains the movable body 8 tightly against the several adjusting screws and if any of such screws are backed up or reversely turned, the movable body 8, by virtue of the spring 17, will follow the particular screw turns.

A construction such as described enables one to very rapidly and accurately position an object because one does not have to go the rounds of the adjusting screws perhaps more than once because one adjustment does not interfere with the others.

The manually adjustable screws 21, 25 and 26 have been shown as plain simple screws. In the precise work for which my device is adapted, it may well be necessary to provide for a finer adjustment than would be afforded by such screws as ordinarily operated. A device for that purpose which may be substituted for those screws is shown in Fig. 4. In Fig. 4 the bearing point of the screws 35 is arcuate and may be hemispherical or any other desired curvature, as elliptical with the long axis of the ellipse coinciding with the longitudinal axis of the device. The bearing end 35 is the end of a sleeve 36 bearing a feather 37 in a keyway 38 of a hollow member having a knurled head 39 and externally threaded as at 40 and screwed into a threaded through orifice 41 which may be considered as the end wall 20 or the side walls of the fixed body 18. For coarse adjustment the knurled head 39 may be manually manipulated to move the end 35 in and out.

In order to secure a very fine adjustment, I thread the interior of 36, as at 42, with a left hand thread and engage that left hand thread with a left hand thread 43 formed on the spindle 44. I also form a right hand thread 45 on the spindle 44 and cause it to engage a right hand thread in a threaded through bore 46 of a collar 47 secured as by a screw 48 to the knurled head 39. With this construction a turning of knurled head 50 will cause the spindle 44 to advance in one direction and the member 36 to be moved in a contrary direction by reason of the screw 43, so that as a result the member 36 will be moved in either one or the other direction in accordance with the direction given to 50 in an amount determined by the relative difference between the pitches of the screws 43 and 45, so that a very fine adjustment of 35 may be made by turning knurled head 50. It is to be understood, of course, that thread 40 fits within the bore 41 with such a degree of tightness that turning of 50 will not cause the head 39 to turn.

In Fig. 5 I have shown the head 51 which is shown as conical and may be used as an alternative for head 35.

Although I have particularly described one particular physical embodiment of my invention, nevertheless I desire to have it understood that the form selected is merely illustrative and does not exhaust the possible physical embodiments of the idea of means underlying my invention.

What I claim as new and desire to secure by Letters Patent is:

1. A positioning device, including, in combination, an elongated hollow body formed with one end wall also formed with a pivot point in the outer face of the end wall and also formed with an orifice through the end wall spaced from the pivot point, means for supporting an object to be adjusted at the end opposite the end wall, a threaded longitudinal adjusting screw formed with a pivot end contacting the pivot point on the elongated body, a fixed body surrounding the elongated hollow body and formed with a screw threaded orifice to receive the adjusting screw and formed with two screw threaded orifices spaced apart 90° circumferentially of the elongated body and symmetrically about a plane passed longitudinally through the axis of the elongated body and through the pivot point and said two orifices further positioned in a transverse horizontal plane adjacent the object supporting end of the elongated body, threaded adjusting screws, one in each of the two spaced orifices, said screws in the spaced orifices having arcuate free ends and flats at a right angle to the axes of the screws formed on the elongated body for contact with the ends of the screws, a rod attached to the fixed body and passing through the first mentioned orifice and provided with a head, a coiled spring interposed between the said head and the inner face of the end wall of the elongated body.

2. A positioning device, including, in combination, an elongated body, an object supported by the elongated body at one end, a fixed body surrounding the elongated body, three manually movable members supported by the fixed body and bearing on the elongated body, said three members positioned with their axes in longitudinal planes passing through the axis of the elongated body, two of the planes including an angle of 90° therebetween and the third making equal angles with the other two, the member having an axis in the said third plane being a longitudinal adjusting member and the other two being lateral adjusting members positioned in a transverse horizontal plane adjacent the object supporting end of the elongated body, the elongated body formed with a pivot point on the end opposite the object supporting end of the elongated body contacting the longitudinal adjusting member and formed with flats at a right angle to the lateral adjusting members contacting the lateral adjusting members and a single spring provided with an attachment to the fixed body and acting on the elongated body pressing the elongated body tightly against each of the adjusting members.

3. A positioning device, including, in combination, an elongated body, an object supported by the elongated body, a fixed body surrounding the elongated body, three manually movable members supported by the fixed body and bearing on the elongated body, said three members being positioned with their axes in longitudinal planes passing through the axis of the elongated body, two of the planes including an angle of 90° therebetween and a third making equal angles with the other two, the member having an axis in the said third plane being a longitudinal adjusting member and the other two being lateral adjusting members, the elongated body formed with a pivot point contacting the longitudinal adjusting member and the elongated body formed with flats at a right angle to the lateral adjusting members contacting the lateral adjusting members and a helical spring positioned with its axis in the said third plane and on the other side of the longitudinal axis of the elongated body from the pivot point and bearing at one end on the elongated body, a member attached to the fixed body, said helical spring at the other end bearing on said last named member.

4. A positioning device, including, in combination, a hollow elongated fixed body provided with an end wall, a hollow elongated movable body provided with an end wall positioned within the fixed body, an object supported by the elongated movable body at a point remote from the said end wall thereof, a longitudinally adjustable member protruding through the end wall of the fixed body and engaging the end wall of the movable body to form a pivot point, two laterally adjustable members protruding through the fixed body and engaging the movable body, said movable body provided with flats at a right angle to the axes of the lateral adjusting members for such engagement, a headed rod attached to the end wall of the fixed body and protruding into the movable body through the end wall of the movable body, a helical compression spring interposed between the head on the rod and the inner face of the end wall of the movable body, the axes of the laterally adjustable members being in longitudinal planes through the axis of the movable body and including an angle of 90° therebetween and the axis of the longitudinally adjustable member and the axis of the helical spring lying in a longitudinal plane through the axis of the movable body and making equal angles with the planes containing the axes of the laterally adjustable members, the axis of the spring positioned in the plane in which it lies so as to be on the same side of the axis of the movable member as the laterally adjustable members and the longitudinally adjustable member positioned in the same plane so as to lie on the other side of the longitudinal axis of the movable member.

AUGUSTE LOUIS MARIE ANTOINE ROUY.

REFERENCES CITED

The following references are of record in the file of this patent:

UNITED STATES PATENTS

| Number | Name | Date |
|---|---|---|
| 1,138,848 | Dake | May 11, 1915 |
| 1,790,185 | Werner | Jan. 27, 1931 |
| 1,927,642 | Heaton | Sept. 19, 1933 |
| 2,172,719 | Weant | Sept. 12, 1939 |

FOREIGN PATENTS

| Number | Country | Date |
|---|---|---|
| 585,804 | France | Dec. 17, 1924 |